United States Patent
Flink et al.

(10) Patent No.: US 7,024,562 B1
(45) Date of Patent: Apr. 4, 2006

(54) METHOD FOR CARRYING OUT SECURE DIGITAL SIGNATURE AND A SYSTEM THEREFOR

(75) Inventors: Yona Flink, Tel Aviv (IL); Itzhak Gerber, Givat Shmuel (IL); Yariv Maroely, Holon (IL)

(73) Assignee: OptiSec Technologies Ltd., (IL)

( * ) Notice: Subject to any disclaimer, the term of this patent is extended or adjusted under 35 U.S.C. 154(b) by 873 days.

(21) Appl. No.: 09/606,331

(22) Filed: Jun. 29, 2000

(30) Foreign Application Priority Data

Jun. 29, 2000 (IL) ........................ 137099

(51) Int. Cl.
*H04L 9/00* (2006.01)
(52) U.S. Cl. ........................ 713/186; 713/176
(58) Field of Classification Search ........ 713/186, 713/176; 318/115, 116
See application file for complete search history.

(56) References Cited

U.S. PATENT DOCUMENTS

| | | | |
|---|---|---|---|
| 4,529,870 A | 7/1985 | Chaum | ........................ 235/380 |
| 5,031,214 A | 7/1991 | Dziewit et al. | |
| 5,163,091 A | 11/1992 | Graziano et al. | |
| 5,191,613 A | 3/1993 | Graziano et al. | |
| 5,534,855 A | 7/1996 | Shockley et al. | |
| 5,541,994 A | 7/1996 | Tomko et al. | |
| 5,604,802 A | 2/1997 | Holloway | |
| 5,680,460 A | 10/1997 | Tomko et al. | |
| 5,832,091 A | 11/1998 | Tomko et al. | |
| 5,956,409 A | 9/1999 | Chan et al. | ........................ 380/54 |
| 6,035,398 A | 3/2000 | Bjorn | ........................ 713/186 |
| 6,193,153 B1* | 2/2001 | Lambert | ........................ 235/380 |
| 6,310,966 B1* | 10/2001 | Dulude et al. | ........................ 382/115 |

* cited by examiner

*Primary Examiner*—Gilberto Barrón, Jr.
*Assistant Examiner*—Grigory Gurshman
(74) *Attorney, Agent, or Firm*—Baker Botts L.L.P.

(57) ABSTRACT

Method and system for carrying out secure signing of a person on a data packet sent from a sender to a recipient, the sender and the recipient connected to a data network via network connection means. A biometric sample of the person is sampled and converted to a digital form. A first digital seal produced from the combination of the digital data packet and the biometric sample, or from two or more digital seals derived from the digital data packet and the biometric sample. The digital data packet and the biometric sample and the digital seal are sent to the recipient. A second digital seal is produced from the combinations of received digital data packet and the received biometric sample. The first and the second seals are compared and if the first and the second seals are identical, the authentication of the digital signature is approved. Otherwise, the authentication of the digital signature is denied.

11 Claims, 6 Drawing Sheets

METHOD FOR CARRYING OUT SECURE DIGITAL SIGNATURE AND A SYSTEM THEREFOR

FIELD OF THE INVENTION

The present invention relates to the field of authentication. More particularly, the invention relates to a method and system for electronic authentication of data packet(s) by carrying out secure signing of a person on the data packet(s) using unique biometric indicia.

BACKGROUND OF THE INVENTION

In order to facilitate the reading of the description to follow, a number of terms employed in the art are defined below:

- Encryption: The process of turning readable data into cipher data.
- Decryption: The process of transforming cipher data into readable data.
- Cryptography: The science of transforming readable data into cipher data and back again.
- Digital signature: The electronic equivalent of traditional handwritten signatures, usually an encrypted data entity upon which the source of the signature may be identified.
- Key. A single numeric or alphanumeric value that is a part of an algorithm for encryption of data.
- Hash function: A mathematical function which takes a variable-length input data and converts it into a fixed-length binary data, such that said fixed-length data identifies uniquely said variable-length data.
- Digital seal: The fixed-length binary data produced by hash functions.
- Biometric sample: A physiological or behavioral characteristic sample, transferred to a digital form.
- Image of a biometric sample: The digitized form of a biometric sample.
- Template of a biometric sample: A digital array associated uniquely with a biometric sample.
- Authentication: A method for providing a user's identity (such as using passwords or authentication tokens).
- Symmetric encryption: A method involving a single secret key for both encryption and decryption.
- Asymmetric encryption: Encryption using pairs of public and private keys, also known as Public-key Cryptography.

Digital Signatures

Digital signatures are the electronic equivalent of traditional handwritten signatures. However, unlike handwritten signature, a digital signature is hard to forge. It is a computed digest of the text that is encrypted and sent with the text message. The recipient decrypts the signature and recomputes the digest from the received text. If the digest matches, the message is authenticated and proved intact from the sender. However, it cannot disclose what has been changed or how much has been changed in the document.

Digital signatures are especially important for electronic commerce and are a key component of most authentication schemes. To be effective, digital signatures must be unforgeable. There are a number of different encryption techniques to guarantee this level of security. Digital signatures do not provide privacy, but can be easily accomplished with an extra encryption step. Digital signatures and encryption can be used to provide authenticity, confidentiality, integrity, and non-repudiation.

Digital signatures rely on two cryptographic algorithms: public key (asymmetric) cryptography and hash functions.

Public/Private Key Cryptography

Two uniquely related keys are created—a Public key and a Private Key. Actually, they comprise very large numbers. What is encrypted with one key can only be decrypted with the other. One can freely distribute a Public key to recipients, but the Private key is retained by that individual alone.

If one encrypts a message with the Private key and sends it, the recipient can decrypt it with the available Public key, and has confidence that only the owner of the Private key was the author of the message. This is because the owner of the Private key is only one who can encrypt a message with the Private key.

If anyone encrypts a message with a Public key and sends it to the owner of the Private key, he can be confident that only the owner of the private key will be able to read that message.

Hash Function

Hash function is another tool used in digital signature techniques. A one-way hash function, also known as a message digest, fingerprint or compression function, is a mathematical function which takes a variable-length input string and converts it into a fixed-length binary sequence. Furthermore, a one-way hash function is designed in such a way that it is hard to reserve the process, that is, to find a string that hashes to a given value (hence the name one-way). A good hash function also makes it difficult to locate two strings producing the same hash value. Even a slight change in an input string should cause the hash value to change drastically. If 1 bit is flipped in the input string, at least half of the bits in the hash value will flip as a result.

Hash function may be used as a seal for a digital data, since it indicates that changes have been made in the data, similar to breaking the seal of a sealed letter.

Digital Signatures with Public-Key Cryptography and One-Way Hash Functions.

Digital signature assures the associates that the message has not been changed (integrity) and that it really originated from the sender (authenticity). Moreover, the sender is unable to deny having sent the message (non-repudiation) since he is the only one with access to his private key. Digital signatures do not provide privacy, but can be easily accomplished with an extra encryption step.

Figure 1:
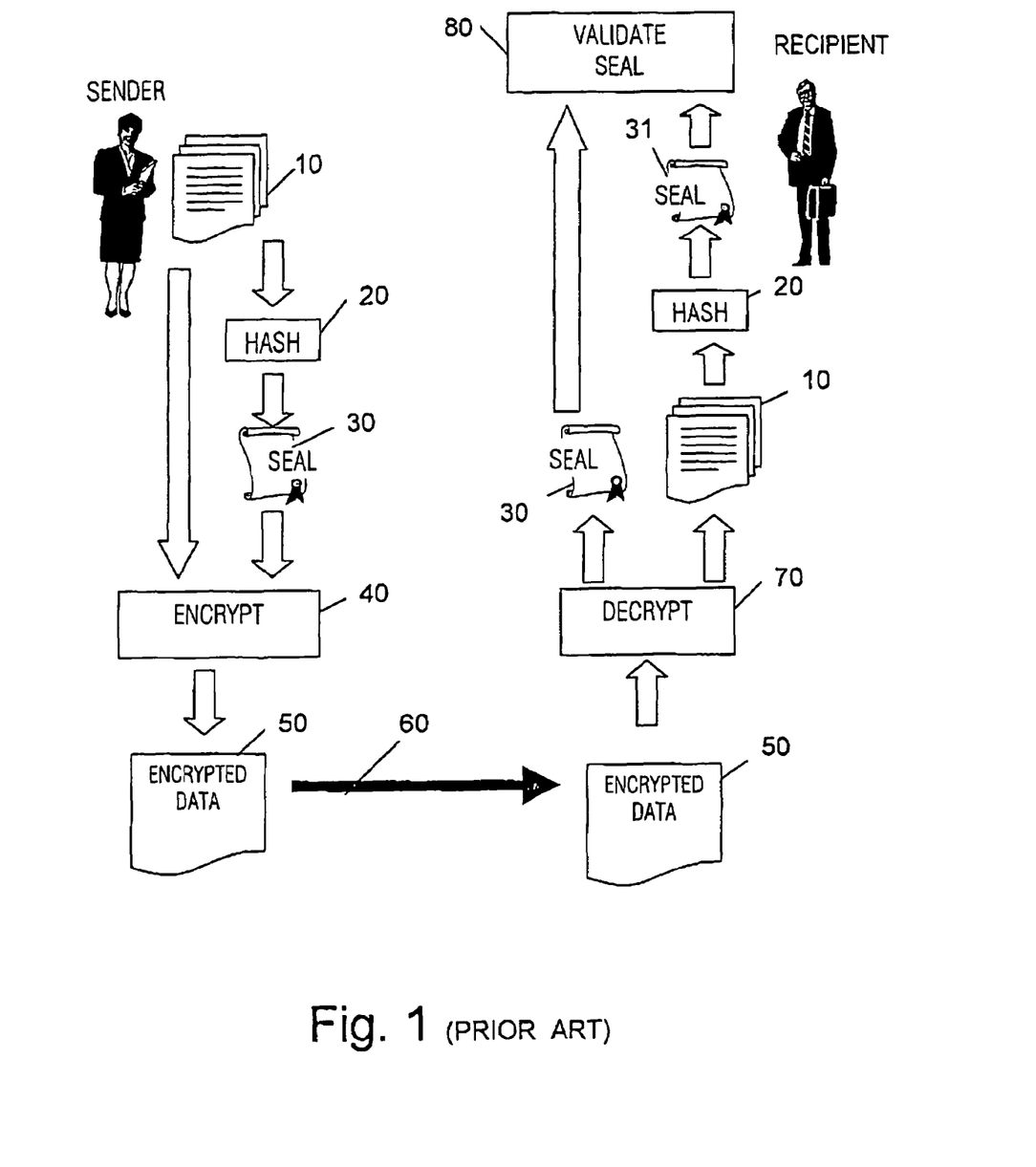
FIG. 1 schematically illustrates a digital signature algorithm, according to the prior art.

FIG. 1 schematically illustrates the steps for creating and verifying a digital signature:

1. Sender runs the document(s) through a hash function.
2. The hash function produces a message digest, a fingerprint of the message.
3. Sender encrypts the document(s) and the message digest with his private key then encrypts the encrypted data with the recipient's public key. The message digest forms the actual "digital seal."
4. Sender transmits both the digital seal and the encrypted message to the recipient.
5. Recipient uses his private key to decrypt the received data and then uses sender's public key to decrypt the encrypted data. As a result the digital document(s) and the digital seal are disclosed.
6. To ensure that the document(s) have not been altered, the recipient runs the document(s) through the same hash function that the sender used.

7. In comparing both digests, the recipient ensures that the content of the message has not been modified by a third party.

To keep objects safe and secure, the following are necessary:

Authentication—assurance of identity.

Authorization—that the party is sanctioned for a particular function.

Privacy—confidentiality.

Data integrity—proof that the object has not been altered.

Non-repudiation—protection against denial of origin of a communication or data.

When all of these requirements are met, the Internet can be used with confidence for all business communication. In order for electronic commerce to take off, a trusted environment and secure transactions are necessary. Consumers and business people alike must be confident that their transactions will not be intercepted or modified. The computer security community has spent more than 10 years developing digital signatures, which are being touted as the cornerstone technology for electronic commerce.

In order to estimate the security level of a method, a method should be tested by its fragility. In the above-mentioned method, there are two phases of security:

The key; and

The hash function.

In order to forge a digital signature, a "hacker" must know how the hash function operates, and the private key of the user. Moreover, an encrypted file which contains a transaction, such as purchase, may be resent over and over by a malicious "hacker", and according to the method described above, the recipient will be in complete ignorance of such malicious tampering.

A solution for the problems of adequate security is adding a biometric sample of the user who initiates the transaction. Biometrics are automated methods of recognizing a person based on a physiological or behavioral characteristic. Examples of human traits used for biometric recognition include fingerprints, voice, speech, face, retina, iris, handwritten signature, hand geometry, and wrist veins. Biometric recognition can be used in identification mode, in which the biometric system identifies a person from the entire enrolled population by searching a database for a match. A system also can be used in verification mode, wherein the biometric system authenticates a person's claimed identity from his/her previously enrolled pattern. Using biometrics for identifying and authenticating human beings offers some unique advantages.

At the core of any biometric system lies a method of establishing that the mathematical equivalent of a person's physical or behavioral characteristics (i.e. template) is already referenced by the system. By comparing the template of a sample with the stored reference, said user may be authenticated or verified. While identification refers to comparing a single template against a database of templates, verification refers to approving an individual's claimed identity.

Only biometric authentication bases identification on an intrinsic part of a human being. Tokens, such as smart cards, magnetic stripe cards, physical keys, and so forth, can be lost, stolen, duplicated, or left at home. Passwords can be forgotten, shared, or covertly observed. While all biometric systems have their own advantages and disadvantages, there are some common characteristics needed to make a biometric system usable.

First, the biometric must be based upon a distinguishable trait. For example, for nearly a century, law enforcement has used fingerprints to identify people. There is a great deal of scientific data supporting the idea that "no two fingerprints are alike." Newer methods, even those with a great deal of scientific support, such as DNA-based genetic matching, sometimes do not hold up in court. Another key aspect is how user-friendly is the system. Most people find it acceptable to have their pictures taken by video cameras or to speak into a microphone. In the United States, using a fingerprint sensor does not seem to be much of a problem. In some other countries, however, there is strong cultural opposition to touching something that has been touched by many other people.

Adding a biometric sample to a digital signature improves security. However, it is not adequate since the presence of a biometric sample by itself does not provide sufficient authentication to the fact the person who should sign the data packet actually signed it and intended to sign it and actually signed it.

It is therefore an object of the present invention to provide a method and system for carrying out secure signing of a person on the data packet(s), which provides higher security level.

It is another object of the present invention to provide a method and system for carrying out secure signing of a person on the data packet(s), which provides improved authentication that the person signed the data packet(s) was present at the moment of signing.

It is a further object of the present invention to provide a method and system for carrying out secure signing of a person on the data packet(s), which verify that the person whose personalized biometric sample is attached to the data packet actually signed the data packet(s).

It is a still further object of the present invention to provide a method and system for carrying out secure signing of a person on the data pack-et(s), that allow to add several signatures to a document.

Other objects and advantages of the invention will become apparent as the description proceeds.

SUMMARY OF THE INVENTION

In one aspect the invention is directed to a method for carrying out secure signing of a person on a data packet(s) sent from a sender to a recipient, the sender and the recipient connected to a data network via network connection means, comprising the steps of:
  a) sampling one or more biometric sample(s) of the person and converting the biometric sample(s) to a digital form;
  b) producing a first digital seal from the combination of the digital data packet(s) and the biometric sample(s), or from two or more digital seals derived from the digital data packet(s) and the biometric sample(s);
  c) sending the digital data packet(s) and the biometric sample(s) and the digital seal to the recipient;
  d) producing a second digital seal from the combination(s) of received digital data packet(s) and the received biometric sample(s);
  e) comparing the first and the second seals; and
  f) if the first and the second seals are identical, approving the authentication of the digital signature, otherwise denying the authentication of the digital signature.

The method may further comprise:
  a) providing a system for sampling biometric samples and storing the same in digital form;
  b) providing means for encrypting data at the sender's location;

c) providing means for decrypting data at the recipient's location;
d) sampling one or more biometric sample(s) and converting the biometric sample(s) to digital form;
e) producing a first digital seal from the digital data packet(s) and the biometric sample(s);
f) encrypting the digital data packet(s), the biometric sample(s) and the first digital seal or the two or more digital seals by the encryption means;
g) sending the encrypted data to the recipient;
h) decrypting the encrypted data by the recipient;
i) producing a second digital seal from the received digital data packet(s) and the received biometric sample(s);
j) comparing the first and the second seals; and
k) if the seals have been found identical, approving the authentication of the digital signature, otherwise denying the authentication of the digital signature.

Optionally, the encryption/decryption is carried out by using private and/or public keys.

The method may further comprise the steps of:
a) providing a computerized server for managing the signing process, the server being connected to a network via network connection means;
b) providing a database system for storing signed data packet(s), unsigned data packet(s), a list of authorized users, the users' personal details and biometric templates, the database system accessible by the server;
c) providing one or more client terminal(s) for managing the signing process at the user's location, the terminal(s) being coupled with means for carrying out biometric samples, the terminals(s) being connected to the network via network connection means;
d) providing a list of users authorized for carrying out a digital signature, the users list, the users' personal details and their template(s) being stored in the database system;
e) providing a software component at the client's terminal for producing a template of a biometric sample;
f) providing another software component for comparing digital seals;
g) sending a request for carrying out a digital signature to the server;

At the server's location:
h) upon receiving a request for carrying out a digital signature from a client's terminal, generating a digital ID associated with the session;
i) sending the digital ID from the server to the client terminal;

At the client's location:
j) upon receiving a digital ID from the server, producing a digital package comprised of the digital ID, the personal information and the template and/or the image of a sample of the user;
k) adding a digital seal of the digital package to the digital package;
l) sending the digital package to the server;
m) identifying the user by the personal details comprised in the digital package;
n) authenticating the user's signature by comparing the received template with the template of the user which is stored in the database;
o) producing a second digital seal of the received digital package; and
p) upon positive results in the verification and the authentication and the comparison, approving the authentication of the digital signature, otherwise denying the authentication of the digital signature.

The method may further comprise the steps of:
a) providing means for encrypting and decrypting of data, the means residing on the server and the client(s);
b) encrypting any data to be sent; and
c) decrypting any received data.

Optionally, the digital ID is obtained randomly.

Optionally, the digital seal is derived from a hash function.

Optionally, the encryption-decryption is symmetric or asymmetric.

Optionally, the biometric sample(s) is chosen from fingerprint(s), voice, speech, face, retina, iris, handwritten signature, hand geometry, veins.

Optionally, the data is sent via the Internet and/or via the Intranet and/or via a WAN (Wide Area Network) and/or via a LAN (Local Area Network) and/or via a WAP (Wireless Application Protocol) and/or via the telephone network and/or by FTP (File Transfer Protocol) and/or by e-mail.

In another aspect, the invention is directed to a system for carrying out secure digital signature on one or more digital data packet(s) comprising:
a computerized server for managing the signing process, the server being connected to a network via network connection means;
a database system for storing signed data packets, unsigned data packets, a list of authorized users, the users' personal details and biometric templates, the database system accessible by the server;
one or more client terminal(s) for managing the signing process at the user's location, the terminal(s) being coupled with means for carrying out biometric samples, and connected to the network via network connection means;
a software component at the client's terminal for producing a template of a biometric sample; and
a software component for comparing digital seals.

The system may further comprises means for encrypting and decrypting of data, the means residing on the server and the client(s) terminal(s).

Optionally, the client's terminal is a computer or a set-top box or a mobile phone.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

FIG. 1 schematically illustrates a digital signature algorithm, according to the prior art. It illustrates how a message is sent from the sender to the recipient.

The sender runs the digital document 10 through a hash function 20. As a result of this function, a digital seal 30 is produced. The digital seal is digital data, such as a number, a vector, a string, etc.

In order to keep the document 10 out of public view or from a malicious individual, the digital document may be encrypted, as illustrated in box 40. The digital seal may be encrypted also, in order to add an additional obstacle to a potential "hacker".

The encrypted data 50 is sent to the recipient via a network 60, such as the Internet. In order to carry out delivery, the encrypted data 50 may be sent via FTP service, e-mail, etc.

After the encrypted data 50 reaches the recipient, the data is decrypted, as illustrated in box 70, and the document 10, along with the digital seal, are revealed.

Then, the recipient runs the received document through the same hash function 20, and as a result of this function, a seal 31 is produced.

Seal 30 is then compared with seal 31, as illustrated in box 80. If the compared seals are identical, there is a high probability that the received document is authentic.

Those skilled in the art will appreciate that the process may be implemented on a plurality of documents. Hence, icon 10 represents one or more digital documents. Moreover, the documents may comprise any data, such as file(s), database(s), image(s), multimedia representations), and so forth.

Biometrics are automated methods of recognizing a person based on a physiological or behavioral characteristic. According to the prior art, biometric samples are presented as digests (Templates) upon which two biometric samples may be compared. Hence, the authentication of a person can be carried out by comparing two digests.

Great efforts have been made in the last decade in this field. One of the most popular subjects is AFIS—Automated Fingerprints Identification System (http://onin.com/fp/afis/afis.html).

Fingerprint Verification

There are a variety of approaches to fingerprint verification. Some of them emulate the traditional police method of matching minutiae, others are straight pattern matching devices, and some adopt a unique approach all their own, including moiré fringe patterns and ultrasonics. Some can detect when a live finger is presented, some cannot. There is a greater variety of fingerprint devices available than any other biometric at present.

Potentially capable of good accuracy (low instances of false acceptance) fingerprint devices can also suffer from usage errors among insufficiently disciplined users (higher instances of false rejection) such as might be the case with large user bases. One must also consider the transducer/user interface and how this would be affected by large scale usage in a variety of environments. Fingerprint verification may be a good choice for in-house systems wherein adequate explanation and training can be provided to users and the system is operated within a controlled environment. It is not surprising that the workstation access application area seems to be based almost exclusively around fingerprints, due to the relatively low cost, small size (easily integrated into keyboards) and ease of integration.

Figure 2:
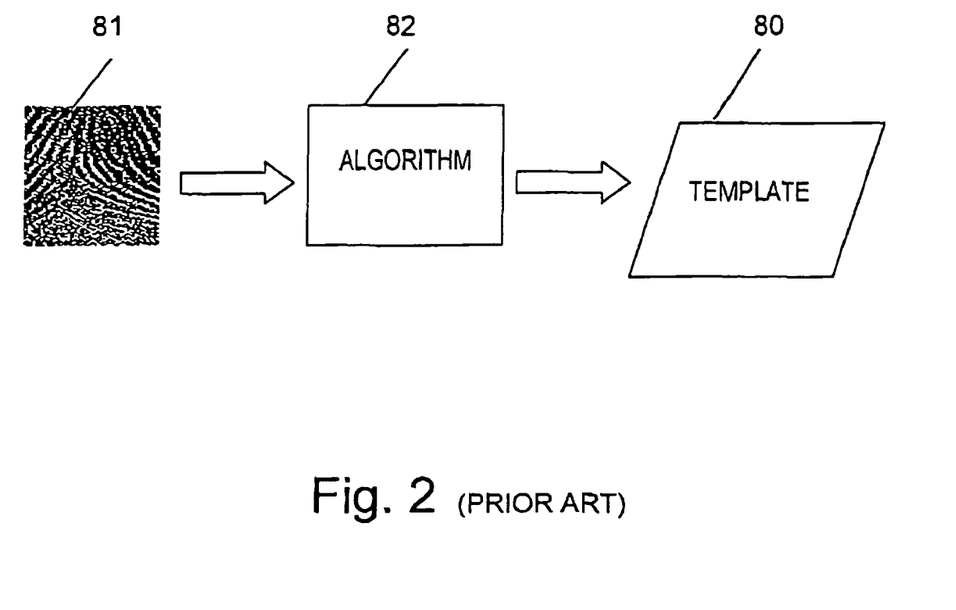
FIG. 2 schematically illustrates the process for producing a digest from a biometric sample.

FIG. 2 schematically illustrates the process for producing a digest from a biometric sample.

The fingerprint 81 is grabbed by a DFR-based device (DFR—Digital Fingerprint Reader). As a result, the fingerprint is converted to a digital image. This image is used as input for the software component 82, which executes an algorithm. As a result, a digital digest is produced 80. The digital digest, hereinafter called "Template", is a group of digital numbers upon which two biometric samples may be compared.

Figure 3:
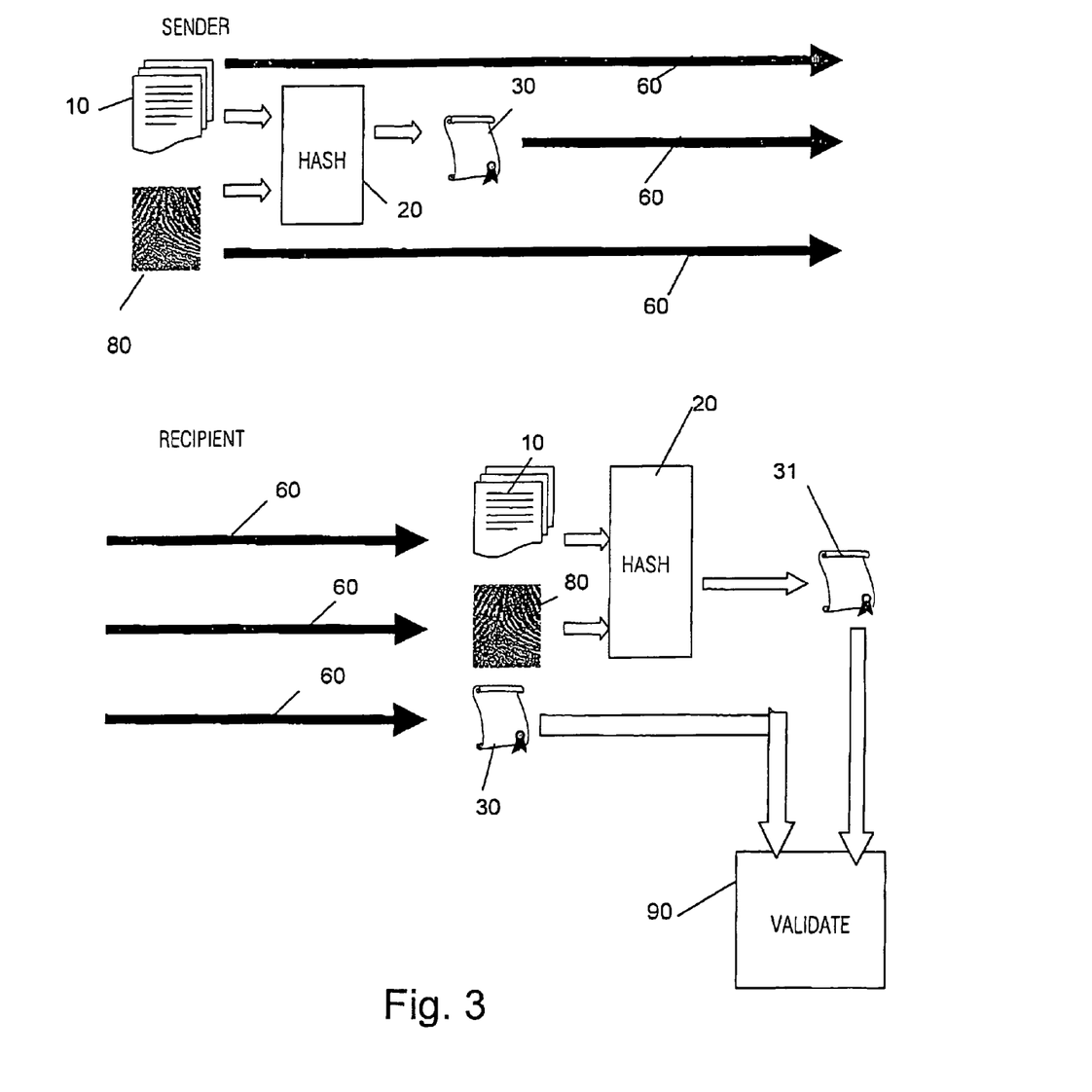
FIG. 3 schematically illustrates a digital signature, which involves biometric sample algorithm, according to a preferred embodiment of the invention.

FIG. 3 schematically illustrates a digital signature, which involves biometric sample algorithm, according to a preferred embodiment of the invention. The digital documents 10 and the biometric sample 80 are passed through a hash function 20. As a result, the seal 30 is produced. The icon 80 represents the image and/or the template of the biometric sample. If the image was the data sent, said data must be processed at the recipient's location in order to receive its template, and to be compared with an authentic template stored at the recipient's location.

At the recipient's location, the same hash function 20 is processed on the data sent by the sender, and a digital seal 31 is produced.

At the next step, as illustrated in box 90, the sent digital seal 30 is compared with the produced digital seal 31. If the compared digital seals are identical, then the conclusion is that the digital signature on the attached digital documents is verified.

Figure 4:
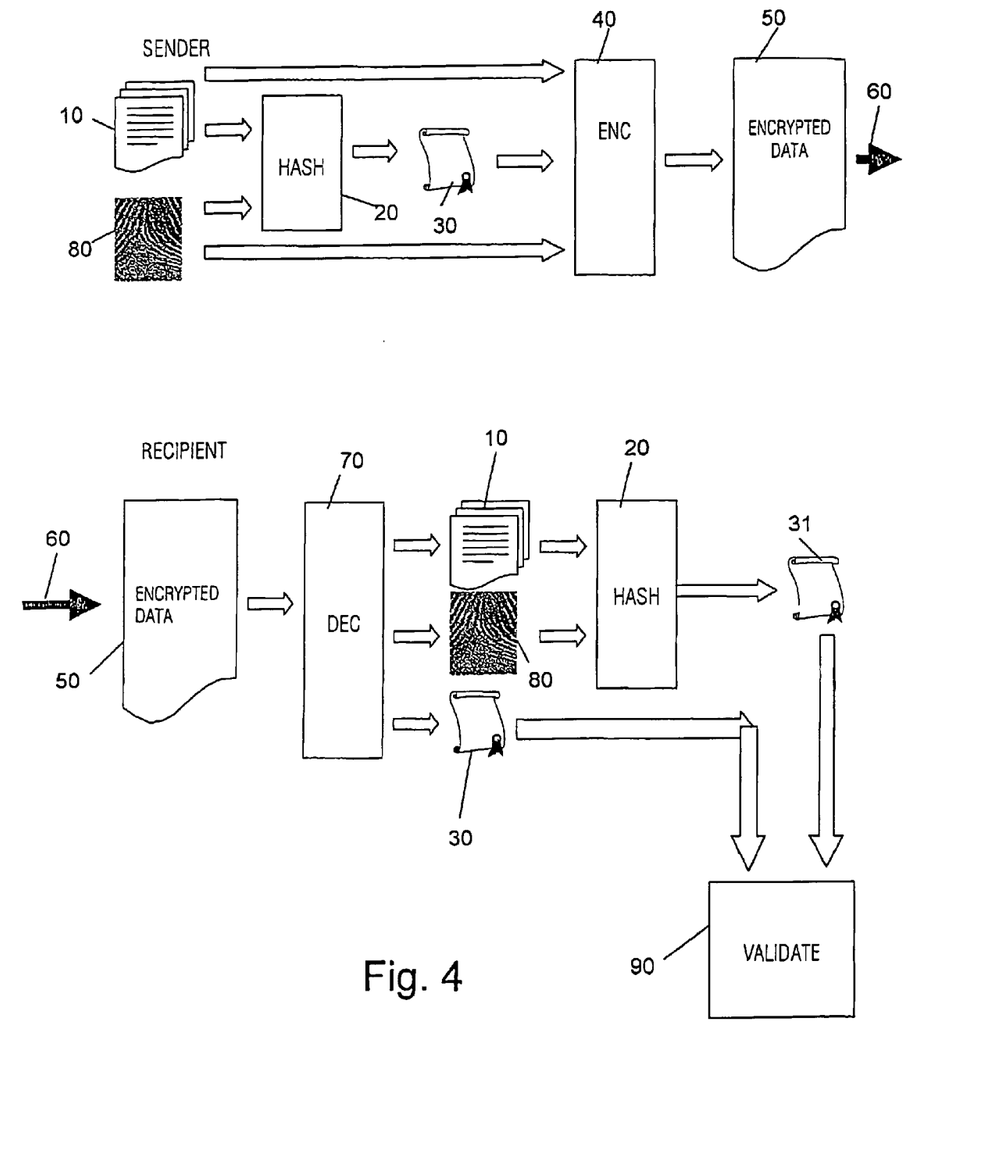
FIG. 4 schematically illustrates a digital signature, which involves biometric sample algorithm and encryption, according to a preferred embodiment of the invention.

FIG. 4 schematically illustrates a digital signature, which involves biometric sample algorithm and encryption, according to a preferred embodiment of the invention.

The digital documents 10 and/or the biometric sample 80 and/or the digital seal 30 are encrypted, as illustrated in box 40. Then, the encrypted data 50 along with the unencrypted data is sent to the recipient, as illustrated in icon 60.

At the recipient's location, the encrypted data 50 is decrypted, as illustrated in box 70. Then, hash function 20 is processed on the same documents as in the sender's location, and as a result, a digital seal 31 is produced.

The produced digital function 31 is compared with the received digital seal 30, as illustrated in box 90. If said seals are identical then the conclusion is that there is a high probability that the digital signature is authentic.

The encryption has two aims: to preserve the privacy of the documents 10, and to add an additional obstacle to the potential "hacker". Therefore, encryption of the digital seal and the template are not mandatory.

Figure 5:
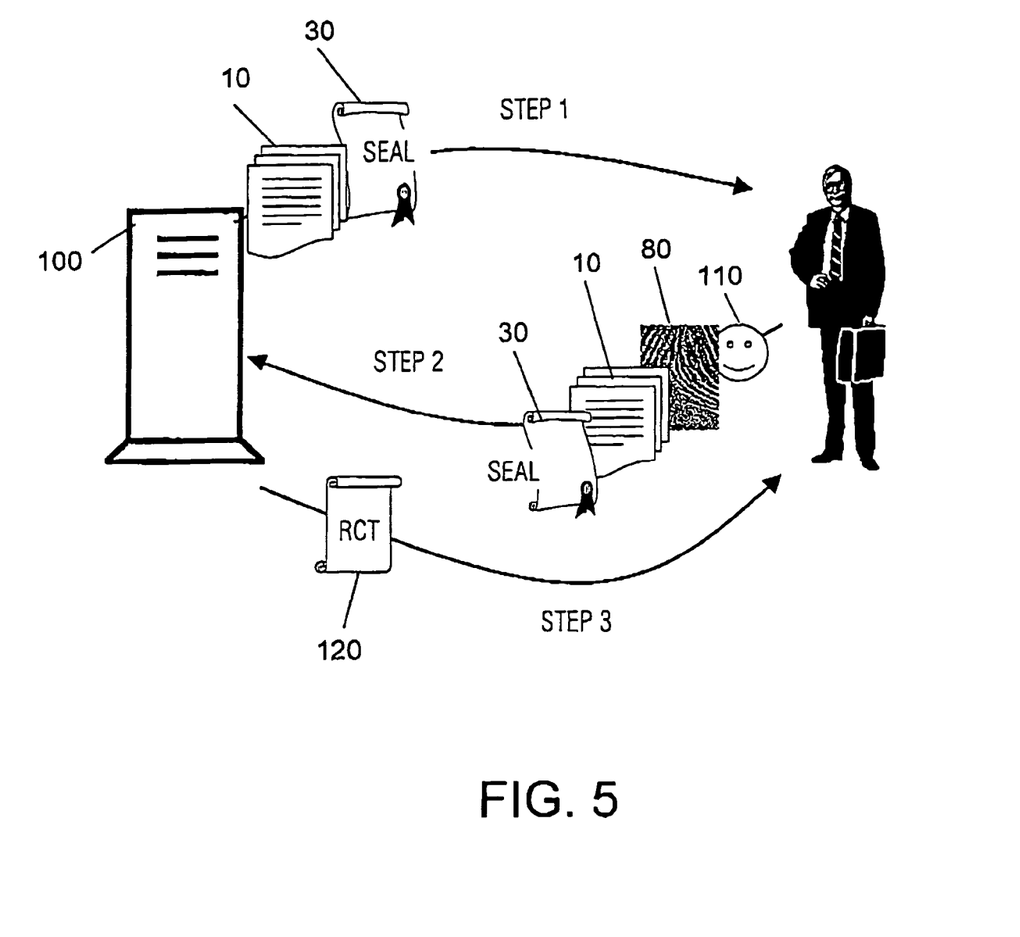
FIG. 5 schematically illustrates a digital signature process, according to a preferred embodiment of the invention.

FIG. 5 schematically illustrates a digital signature process, according to a preferred embodiment of the invention.

A server 100 is involved in the signing process. The server contains a list of authorized users and their personal details. The details may include the template of their biometric sample. The server also contains a list of documents to be signed and/or a software component upon which the user defines the contents of the document to be signed.

The process is carried out in three steps:

Step 1—defining the content of the document(s) to be signed;

Step 2—identification of the user. The details of the user are sent to the server along with the signed document(s); and Step 3—producing an endorsement of the signed document, and sending it to the user. This step is optional.

The First Step

At this step the content of the document(s) to be signed is defined. This step can be carried out by a dialogue between the server and the user, by completing a form etc, depending on the application. For instance, if the application deals with the ordering of goods from a virtual store, then the order may be filled out by a Web page, which contains a list of the goods. Of course, the Web page may also calculate the cost of the goods. If the signed document is a contract, then the contract may reside at the server's storage device or be composed at the users' location, and subsequently sent to the server.

The Second Step

At this step, which is carried out at the user's location, the system samples a biometric sample of the user. The system may ask the user to enter some additional details such as his name, a password known only to the user, etc. The biometric sample 80, the user's details 110 and the document(s) to be signed, 10, are processed by a hash function, encrypted and then sent to the server. The server authenticates the identity of the user, compares the received document(s) with the authentic document(s) stored at the server's storage, and if all tests fail to detect any forgery, then the digital signature process is approved.

The Third Step

At this step, the server sends a receipt 120 to the user. The receipt may include the signed document(s), the biometric image and the number of the transaction as registered on the server. This number may be used in the future for retrieval of the relevant document(s) regarding this transaction. Of course, this step is not mandatory.

Figure 6:
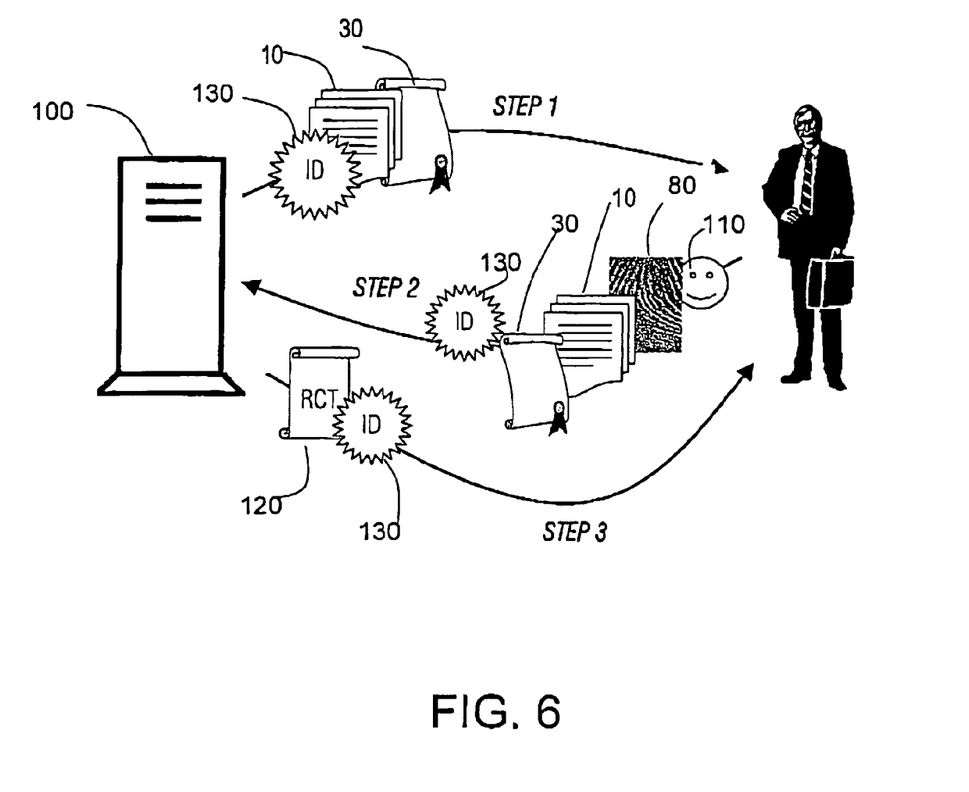
FIG. 6 schematically illustrates a digital signature process, according to another preferred embodiment of the invention.

FIG. 6 schematically illustrates a digital signature process, according to another preferred embodiment of the invention. In order to add another security level, a randomized ID number (marked as 130) is added to the transferred data. This number is generated at the server's location upon receiving a request for carrying out a digital signature. Since the client does not have any information about the random number, the fact that the random number is attached to the sent data adds a further level of security to the method. Moreover, the random number, or a function of it, may be used as the ID of the transaction, by which the transaction can be identified in the future.

According to a preferred embodiment of the invention, the system for carrying out the secure digital signature comprises:

a computerized server for managing the signing process, which is connected to a network via network connection means;

a database system for storing signed data packets, unsigned data packets, a list of authorized users, the users' personal details and biometric templates. The database system should be accessible by the server;

one or more client terminal(s) for managing the signing process at the user's location. The terminal(s) should be coupled with means for carrying out biometric samples, and connected to the network via network connection means;

a software component at the client's terminal for producing a template of a biometric sample; and a software component for comparing digital seals.

The system may also comprise means for encrypting and decrypting of data, that resides on the server and the client(s) terminal(s).

The recipient should be coupled with interface means for browsing the Internet, such as a computer, a set-top box (a device that enables a television set to become a user interface to the Internet) or a mobile/cellular phone which supports the WAP (Wireless Application Protocol) and so forth.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed is:

1. A method for carrying out a secure digital signature of a person on a digital data packet(s) sent from a sender being a third party to at least one recipient, said sender and said at least one recipient connected to a data network via network connection means, comprising the steps of:

a) sampling one or more biometric sample(s) of said person and converting said biometric sample(s) to a digital form;

b) storing said biometric sample at a location accessible to the sender;

c) storing, at the sender side, a digital packet(s) that may be altered by the at least one recipient at said sender side;

d) sending a request from the at least one recipient, to the sender, to select the digital data packet(s) to sign;

e) at said sender side, producing a first digital seal from the combination of said digital data packet(s) and a one-time time stamp generated at said sender side using an asymmetric operator with the private key of said sender and optionally with the public key of said at least one recipient;

f) sending said sealed digital data packet(s) to said at least one recipient;

g) at the at least one recipient side, receiving said sealed digital data packet(s) and opening said sealed digital data packet(s) with the sender's public key and optionally first with the at least one recipient's private key and then with the sender's public key;

h) allowing said at least one recipient to sign the opened digital data packet(s) by adding his biometric sample(s), in real-time, to said opened digital data packet(s);

i) at said at least one recipient side, producing a second digital seal from the combination of said signed digital data packet(s) and said one-time time stamp, using said asymmetric operator, with the public key of said sender and optionally with the private key of said at least one recipient;

j) at the sender side, receiving said sealed digital data packet(s) and opening said sealed digital data packet(s) with the sender's private key and optionally first with the at least one recipient's public key;

k) at the sender's side;

k.1) verifying that the signed digital data packet(s) has not been altered after sealing by the at least one recipient;

k.2) comparing the biometric sample(s) attached to said opened digital data packet(s) with the at least one recipient's stored biometric sample(s);

k.3) if the signed digital data packet(s) has not been altered after sealing by the at least one recipient and the biometric sample(s) attached to said opened digital data packet(s) and the at least one recipient's stored biometric sample(s) are identical, approving the authentication of said digital signature, otherwise denying the authentication of said digital signature; and iv) providing the option of sending, by said sender, a receipt to all said recipients to confirm the authentication and receipt of said digital packet(s).

2. A method according to claim 1, comprising the steps of:
a) providing a computerized server for managing the signing process, said server being connected to a network via network connection means;
b) providing a database system for storing signed data packet(s), unsigned data packet(s), a list of authorized users, said users' personal details and biometric templates, said database system accessible by said server;
c) providing one or more client terminal(s) for managing the signing process at the user's location, said terminal(s) being coupled with means for carrying out biometric samples, said terminals(s) being connected to said network via network connection means;
d) providing a list of users authorized for carrying out the digital signature, said users list, said users' personal details and their template(s) being stored in said database system;
e) providing a software component at the client's terminal for producing a template of a biometric sample;
f) providing another software component for comparing digital seals;
g) sending a request for carrying out the signature to said server;

At said server's location:
h) upon receiving a request for carrying out a digital signature from a client's terminal, generating a digital ID associated with said session;
i) sending said digital ID from said server to said client terminal;

At said client's location:
j) upon receiving a digital ID from said server, producing a digital package comprised of said digital ID, the personal information and the template and/or the image of a sample of said user;
k) adding a digital seal of said digital package to said digital package;
l) sending said digital package to said server;
m) identifying said user by the personal details comprised in said digital package;
n) authenticating said user's signature by comparing said received template with the template of said user which is stored in said database;
o) producing a second digital seal of said received digital package; and
p) upon positive results in said verification and said authentication and said comparison, approving the authentication of said digital signature, otherwise denying the authentication of said digital signature.

3. A method according to claim 1 further comprising the steps of:
a) providing means for encrypting and decrypting of data, said means residing on said server and said client(s);
b) encrypting any data to be sent; and
c) decrypting any received data.

4. A method according to claim 2, wherein said digital ID is obtained randomly.

5. A method according to claim 1 wherein said digital seal is derived from a hash function.

6. A method according to claim 1 wherein said encryption-decryption is symmetric/asymmetric.

7. A method according to claim 1 wherein said biometric sample(s) is chosen from fingerprint(s), voice, speech, face, retina, iris, handwritten signature, hand geometry, veins.

8. A method according to claim 1 wherein said data is sent via the Internet and/or via the Intranet and/or via a WAN (Wide Area Network) and/or via a LAN (Local Area Network) and/or via a WAP (Wireless Application Protocol) and/or via the telephone network and/or by FTP (File Transfer Protocol) and/or by e-mail.

9. A system for carrying out secure signing of a person on a digital data packet(s) sent from a sender being a third party to at least one recipient, said sender and said at least one recipient connected to a data network via network connection means, comprising:
a computerized server for managing the signing process, said server being connected to said data network via said network connection means;
a database system for storing signed data packets, unsigned data packets, a list of authorized users, said users' personal details and biometric templates, said database system accessible by said server;
a sender's terminal for managing the signing process at the sender's side, connected to said network via network connection means;
one or more recipient's terminals for performing the signing process at the recipient side, said one or more recipient's terminals being coupled with means for carrying out a biometric sample(s) of said at least one recipient, and connected to said network via network connection means;
a software component at said sender's terminal, which after receiving a request from said at least one recipient to select the digital data packet(s) to sign, produces a first digital seal from the combination of said digital data packet(s), and produces a one-time time stamp using an asymmetric operator, and then sends said sealed digital data packet(s) to said one or more recipient's terminals;
a second software component at said one or more recipient's terminals for receiving said sealed digital data packet(s), for opening said sealed digital data packet(s), for allowing said at least one recipient to sign the opened digital data packet(s) by adding his biometric sample(s) to said opened digital data packet(s), for producing a second digital seal from the combination of said signed digital data packet(s) and said one-time time stamp, using said asymmetric operator; and
a third software component for verifying that the signed digital data packet(s) has not been altered after sealing by said at least one recipient and comparing the biometric sample(s) attached to said opened digital data packet(s) with the at least one recipient's stored biometric sample(s).

10. A system according to claim 9, further comprising means for encrypting and decrypting of data, said means residing on said server, and said sender's terminal, and said one or more recipient's terminals.

11. A system according to claim 9, wherein said sender's terminal is a computer or a set-top box or a mobile phone and said one or more recipient's terminals are any combination of computers, or set-top boxes, or mobile phones.

* * * * *